United States Patent
Steinwandter et al.

(10) Patent No.: US 9,051,215 B2
(45) Date of Patent: Jun. 9, 2015

(54) METHOD AND DEVICE FOR REMOVING MERCURY DURING THE PRODUCTION OF CEMENT CLINKER

(75) Inventors: Andreas Steinwandter, Ried Im Innkreis (AT); Manfred Lisberger, Riedau (AT)

(73) Assignee: Scheuch GmbH, Aurolzmuenster (AT)

( * ) Notice: Subject to any disclaimer, the term of this patent is extended or adjusted under 35 U.S.C. 154(b) by 0 days.

(21) Appl. No.: 14/119,001

(22) PCT Filed: May 21, 2012

(86) PCT No.: PCT/AT2012/000138
§ 371 (c)(1),
(2), (4) Date: Nov. 20, 2013

(87) PCT Pub. No.: WO2012/159137
PCT Pub. Date: Nov. 29, 2012

(65) Prior Publication Data
US 2014/0109807 A1 Apr. 24, 2014

(30) Foreign Application Priority Data
May 20, 2011 (AT) .................................. A 733/2011

(51) Int. Cl.
*C04B 7/36* (2006.01)
*B01D 53/64* (2006.01)
*C04B 7/52* (2006.01)
(Continued)

(52) U.S. Cl.
CPC ............... *C04B 7/364* (2013.01); *B01D 53/64* (2013.01); *B01D 53/78* (2013.01);
(Continued)

(58) Field of Classification Search
CPC ................. B01D 2251/108; B01D 2258/0233; B01D 53/64; B01D 53/78; B01D 53/8665; C04B 7/364; C04B 7/365; C04B 7/436; C04B 7/52; F27B 7/20; F27B 7/2025; F27D 17/008
See application file for complete search history.

(56) References Cited

U.S. PATENT DOCUMENTS 5,264,013 A * 11/1993 Brentrup ......................... 95/128
2009/0193968 A1 * 8/2009 Jepsen et al. .................... 95/134
(Continued)

FOREIGN PATENT DOCUMENTS

| JP | 2005097005 A | 4/2005 |
| JP | 2007015875 A | 1/2007 |

OTHER PUBLICATIONS

Translation of JP2007/015875 A, Jan. 25, 2007, Nagoshi, et al.*
(Continued)

*Primary Examiner* — Christopher P Jones
(74) *Attorney, Agent, or Firm* — Laurence A. Greenberg; Werner H. Stemer; Ralph E. Locher

(57) ABSTRACT

A method and a device remove mercury from exhaust gases during a production of cement clinker. The device contains a pre-heating stage, a feed point for raw materials required for the production of the cement clinker, a rotary kiln for burning the raw materials, a filter stage for removing dust from the exhaust gases conducted in the main flow, and a raw mix mill for partially mill drying the raw materials. A circuit for the mercury in the exhaust gases is formed between the pre-heating stage and the raw mix mill or the filter stage. To achieve good mercury removal at low cost, a sub-flow of 1 to 30 volume percent of the exhaust gases is branched off from the main flow of the exhaust gases having a temperature of at least 300° C. A separator and thereafter at least one stage for removing mercury are arranged in the sub-flow.

19 Claims, 3 Drawing Sheets

(51) Int. Cl.
*F27B 7/20* (2006.01)
*F27D 17/00* (2006.01)
*C04B 7/43* (2006.01)
*B01D 53/78* (2006.01)
*B01D 53/86* (2006.01)

(52) U.S. Cl.
CPC ...... *B01D 53/8665* (2013.01); *B01D 2251/108* (2013.01); *B01D 2258/0233* (2013.01); *C04B 7/365* (2013.01); *C04B 7/52* (2013.01); *F27B 7/20* (2013.01); *F27B 7/2025* (2013.01); *F27D 17/008* (2013.01); *C04B 7/436* (2013.01)

(56) References Cited

U.S. PATENT DOCUMENTS

2011/0041690 A1    2/2011   Jepsen et al.
2012/0118151 A1*   5/2012   Schulz et al. .................. 95/108

OTHER PUBLICATIONS

Andersen, C., "Retrofitting of electrostatic precipitators", Special Filtration, ZKG International, Sep. 2000, vol. 62, pp. 52-54.

* cited by examiner

METHOD AND DEVICE FOR REMOVING MERCURY DURING THE PRODUCTION OF CEMENT CLINKER

BACKGROUND OF THE INVENTION

Field of the Invention

The invention relates to a method for separating mercury from the exhaust gases during the production of cement clinker, wherein the raw materials required for the production of cement clinker are fed into a pre-heating stage against the direction of the exhaust gases according to the counter flow principle, and fired in a rotary kiln, wherein the mercury bonded in the raw materials is vaporised due to the heating of the raw materials in the pre-heating stage and the exhaust gases conducted in a main flow are used for at least partially mill drying the raw materials in at least one raw mix mill and dedusted in at least one filter stage before their escape to the atmosphere, and the dust separated in the at least one filter stage is fed into the pre-heating stage at least partially together with the milled raw material, so a circuit for the mercury in the exhaust gases is formed between the pre-heating stage and the raw mix mill or the at least one filter stage.

Furthermore, the invention relates to a device for separating mercury from the exhaust gases during the production of cement clinker, comprising a pre-heating stage, a feed point for the raw materials required for the production of cement clinker against the direction of the exhaust gases according to the counter flow principle in the pre-heating stage, a rotary kiln for firing the raw materials, at least one filter stage for dedusting the exhaust gases conducted in a main flow before their escape to the atmosphere, and at least one raw mix mill for at least partially mill drying the raw materials, wherein a circuit for the mercury in the exhaust gases is formed between the pre-heating stage and the raw mix mill or the at least one filter stage.

During the production of cement clinker various raw materials such as limestone and clay are fired in a rotary kiln. Many of the raw materials used contain mercury, which vaporises when heated in the pre-heating stage and is re-bonded to the dust when the exhaust gases are cooled. Together with the dust separated in a filter stage, the major portion of the mercury is re-circulated into the production process for cement clinker, and only a small portion escapes to the atmosphere together with the exhaust gas. The mercury load is mainly introduced by the raw materials used in the process while a small portion of the mercury introduction may also stem from the fuels.

The present patent application is directed primarily at the production of cement clinker but may also be used in other thermal production methods where a significant circulating behaviour of certain contaminants in the exhaust gases is observed.

Basically, it is possible to separate or reduce the mercury present in the raw materials already before using them for the production of cement clinker. This may be done, for example, by treating the raw materials with hot gases, so at least part of the mercury content vaporises and may subsequently be separated in concentrated form. However, heating the raw materials requires relatively large amounts of energy, thus raising total costs and making the method uneconomical for high throughputs of material.

Solutions in which the entire flow of exhaust gases of the rotary kiln used during the production of cement clinker is cleaned by means of certain exhaust gas cleaning methods for the separation of mercury, such as activated-carbon filters, are not acceptable from an economical point of view, either, because of the large amounts of required air and the large size that is thus required for these facilities.

BRIEF SUMMARY OF THE INVENTION

As a consequence, it is the object of the present invention to provide an aforementioned method and an aforementioned device for separating mercury from the exhaust gases during the production of cement clinker allowing a sufficiently high reduction of the mercury emissions. Furthermore, required additional energy and the exhaust gas volume flow to be cleaned should be kept as low and as small as possible, respectively, so operation and installation may be as cost-efficient as possible.

Regarding the method, this object is achieved by branching off from the main flow of exhaust gases a sub-flow of 1 to 30, in particular 5 to 20, per cent by volume of the exhaust gases having a temperature of at least 300° C., and by first dedusting the exhaust gases of this sub-flow, then separating the mercury contained therein. Consequently and according to the invention, only a small portion of the main flow of exhaust gases is branched off and fed, at least partially, to dedusting and a subsequent separation of mercury. Another substantial aspect is that this branching-off of the sub-flow of exhaust gases is performed in a section of the process where at least a major part of the mercury conducted in the circuit is present in a gaseous state. This is the case at temperatures from approx. 300° C. since mercury and its compounds have relatively low boiling temperatures. According to studies, at least 80% of the present mercury is gaseous (oxidised or elemental) in the upper range of the pre-heating stage at temperatures between 300 and 450° C. The higher the share of gaseous mercury is, the smaller are the amounts of exhaust gases that need to be treated in the sub-flow in order to relieve the main flow to an equal extent. Since only a part of the entire amount of exhaust gases created during the production of cement clinker needs to be treated, the filter stages and facilities provided for separating the mercury may be designed smaller, thus consuming less energy during operation. Especially with degrees of separation from 20 to 80%, for example, the present method and the present device may be designed highly cost-efficient. Therefore, at least a high-temperature dedusting and at least a separation of mercury are included in the sub-flow of exhaust gases.

It is advantageous to lower the temperature of the exhaust gases of the sub-flow before separating the mercury. The lowering of the temperature may be performed, for example, in a quench by injecting water. The lowering of the temperature may also be combined with the simultaneous separation of mercury.

According to another feature of the invention, the dust separated from the sub-flow is recirculated into the pre-heating stage for energy reasons.

Advantageously, the exhaust gases of the sub-flow are recirculated into the main flow of exhaust gases as well. The separation of mercury is thus performed in a bypass of the main flow of exhaust gases where only a sub-flow of exhaust gases is conducted.

In order to improve the energy balance of the method, the heat of the exhaust gases of the sub-flow may preferably be recovered after the dedusting, and the recovered heat may be recirculated into the cleaned sub-flow before recirculating it into the main flow of exhaust gases. The heat recovery may be performed by means of conventional heat exchangers or the like. Alternatively, the recovered heat may also be used at a different point or utilised for power generation.

Seen in the flowing direction of the exhaust gases, the sub-flow of exhaust gases is branched off from the main flow of exhaust gases preferably after or in the pre-heating stage. In the pre-heating stage or after the pre-heating stage seen in the flowing direction of the exhaust gases, the exhaust gases usually have a temperature of above 300° C., so it can be guaranteed that a major portion of the mercury load present in the system is gaseous.

At least a portion of the dust separated from the exhaust gases in the at least one filter stage may be added to the branched-off sub-flow of exhaust gases.

A bag filter may be used for separating the mercury in the sub-flow of exhaust gases. By lowering the temperature accordingly, the mercury, most of which has initially been present in gaseous form, is condensed, and the resulting particles may be separated by the filter material of the bag filter. The particles with the mercury bonded therein are discharged from the bag filter and discarded at regular intervals or recirculated into the production process for cement clinker.

The separation rate of the bag filter may be improved by adding at least one additive such as a reactive agent (for example polysulfides, bromides) for altering the physical properties of the mercury, or adsorbing substances (such as activated carbon) for bonding the mercury.

As an alternative to the bag filter, the mercury may also be separated from the exhaust gases of the sub-flow by means of a scrubber, in particular with metal sulfide solutions, limestone suspensions or sour scrubbing agents combined with organisulfidic precipitation agents being used as scrubbing liquids, so the mercury is concentrated after treating the waste water of the scrubber. Especially if the separated mercury needs to be discarded, it is advantageous for it to be concentrated accordingly high by the separation method.

As an alternative to the methods described above, the mercury may also be separated from the exhaust gases of the sub-flow by means of a fixed-bed adsorber or a moving-bed adsorber. In general, moving-bed adsorbers allow higher degrees of separation and better utilisation of the sorbents used than entrained flow processes.

According to another feature of the invention, it is particularly advantageous if the concentration of the mercury in the main flow of exhaust gases is increased. An increase in the concentration of the mercury in the main flow will lead to a subsequent increase in the concentration of mercury in the sub-flow as well, thereby improving the separation rates that may be obtained in the cleaning of the sub-flow accordingly. The increase in the concentration of mercury in the main flow may be accomplished in various ways.

For example, the concentration of the mercury in the main flow of exhaust gases may be increased by optimising the at least one filter stage in the main flow of exhaust gases for the separation of mercury, and by feeding into the pre-heating stage at least part of the mercury separated in the at least one filter stage. By doing so, the mass flow of the mercury conducted in the circuit will be increased accordingly.

An improvement in the separation of the mercury in the at least one filter stage of the main flow of exhaust gases may be obtained by adding additives such as bromides, chlorides or activated carbon at appropriate points in the exhaust gas path of the rotary kiln. Such additives alter the modification of the mercury or bond the mercury and thus exhibit an especially favourable effect on the separation of the mercury in the at least one filter stage.

Another improvement in the separation of mercury in the at least one filter stage of the main flow of exhaust gases may be obtained by decreasing the temperature before the at least one filter stage. Here, heat exchangers or evaporating coolers are particularly suitable for lowering the temperature to 60° C. to 140° C., preferably 80° C. to 120° C. The separation of the mercury in the at least one filter stage may be increased because of the reduced pressure of the vapour.

Further improvements may be obtained by increasing the separation of mercury in the at least one filter stage of the main flow of exhaust gases by means of a catalyser, which is arranged between the pre-heating stage and the raw mix mill or the at least one filter stage and alters the chemical bonding of the mercury. The mercury is oxidised in such catalysers (for example tungsten catalysers and vanadium catalysers).

Improvements are obtained by adding a reactive agent for altering the chemical bonding of the mercury before the catalyser. Bromides and chlorides are particularly suitable for this purpose.

The object according to the invention is also achieved by an aforementioned device for separating mercury from the exhaust gases during the production of cement clinker, wherein a sub-flow of 1 to 30, in particular 5 to 20, per cent by volume of the exhaust gases is branched off in a region of the main flow of exhaust gases having a temperature of at least 300° C., wherein at least one separator for dedusting the exhaust gases of the sub-flow and thereafter at least one stage for separating the mercury from the exhaust gases of the sub-flow are arranged in the sub-flow. For possible embodiments and advantages of the device according to the invention, reference is made to the above description of the method for separating mercury from the exhaust gases during the production of cement clinker.

The present invention will be explained in more detail by means of the attached drawings.

DESCRIPTION OF THE INVENTION

Figure 1:
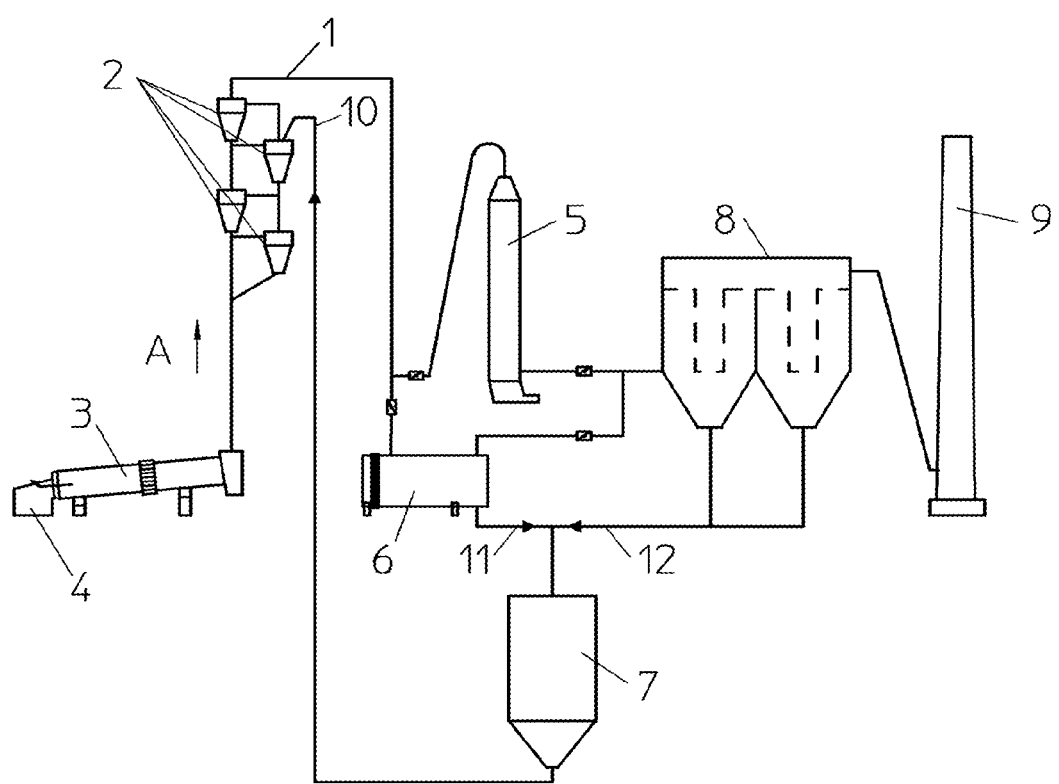
FIG. 1 shows a block diagram of a device for the production of cement clinker according to the prior art.

FIG. 1 shows a block diagram of a device for the production of cement clinker according to the prior art. According to the counter flow principle, i. e. against the direction A of the exhaust gases 1, the raw material 10 required for the production of cement clinker is fed into a pre-heating stage 2 that is usually comprised of several cyclones arranged on top of each other. The appropriately pre-heated raw material 10 moves from the pre-heating stage 2 into the rotary kiln 3 where the material is fired to turn into cement clinker. The cement clinker is discharged by a specific cooling and discharge device 4 and forwarded into appropriate silos (not shown). Before escaping to the atmosphere, the exhaust gases are fed into a raw mix mill 6 for at least partially mill drying them, or they are cooled in a cooling device 5 such as an evaporating cooler and dedusted in a filter stage 8. Then the exhaust gases 1 are transported to the atmosphere via a chimney 9. The dust 12 separated in the filter stage 8 and the milled raw material 11 from the raw mix mill 6 are mixed in a silo 7 and fed into the pre-heating stage 2 together, thereby forming the raw material

10. Due to the way material and exhaust gases are conducted in countercurrent flows, a circuit for the mercury contained in the exhaust gases 1 is formed between the pre-heating stage 2 and the raw mix mill 6 or the at least one filter stage 8 by material recirculation. The mass flow of mercury conducted in the circuit is a multiple of the input mass flow of mercury from the fresh raw materials 10 and the fuels.

Figure 2:
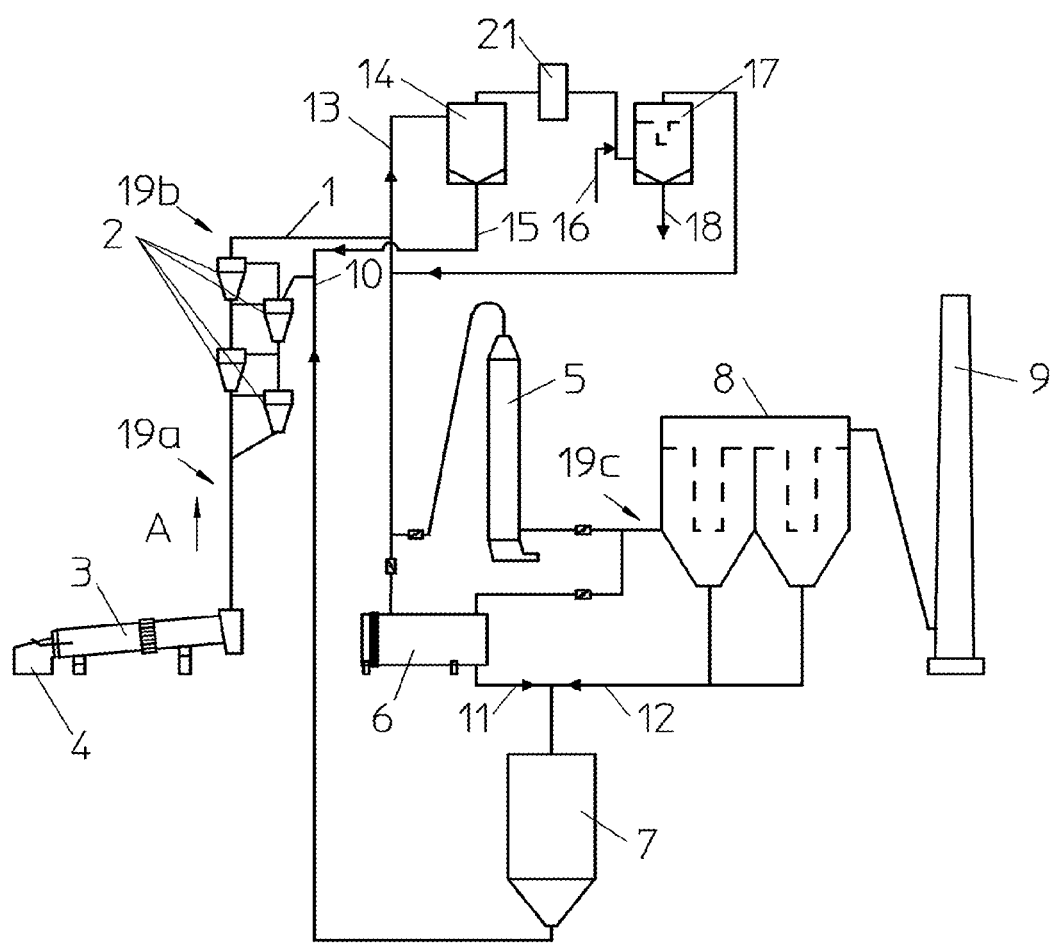
FIG. 2 shows a block diagram of a device for the production of cement clinker including an embodiment of the method for separating mercury.

FIG. 2 shows the block diagram of a possible installation of an embodiment of the method for separating mercury from the exhaust gases during the production of cement clinker having an optimised filter stage 8 in the production process for cement clinker of FIG. 1. According to the invention, a sub-flow 13 is extracted from the exhaust gases 1. In the example illustrated, the sub-flow 13 of the exhaust gases 1 is branched off after the pre-heating stage 2. The sub-flow 13 of exhaust gases 1 is at least partially dedusted in a separator 14, and in the embodiment shown, the separated dust 15 is recirculated into the preheating stage 2. After passing through a cooler 21, additives 16 are added to the sub-flow 13, and the mercury is separated in separator stage 17, which may be formed, for example, by a bag filter. The contaminants separated in the separator stage 17 are discharged from the system via the line 18. The separation of the mercury in the the main flow of exhaust gases 1 in the filter stage 8 may be improved by adding additives at different points 19$a$ (e. g. bromides), 19$b$ (e. g. sulfides), 19$c$ (e. g. activated carbon) depending on the required temperature for reactions or adsorption.

Figure 3:
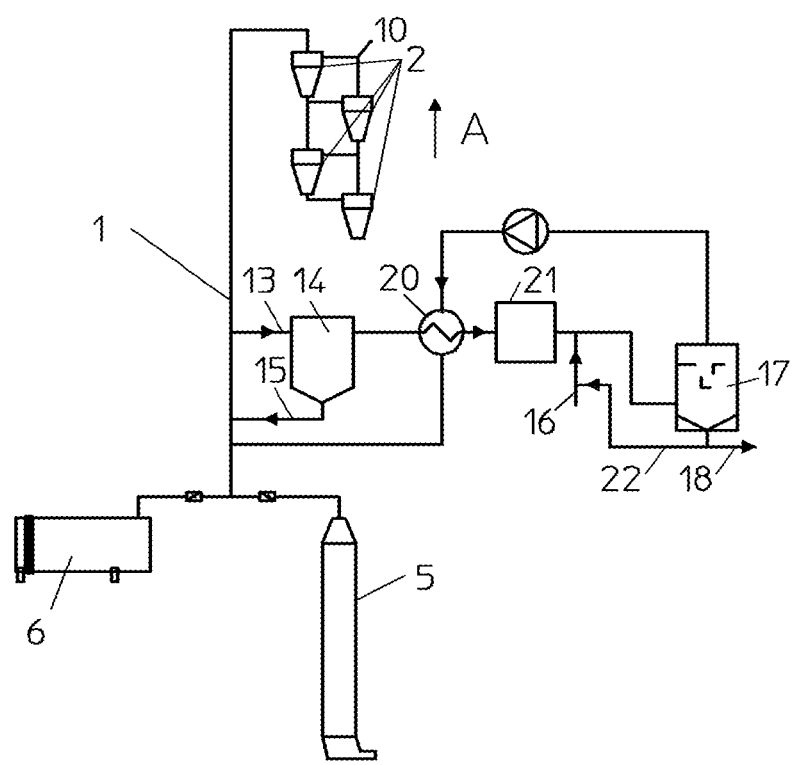
FIG. 3 shows a block diagram of a device for the production of cement clinker including another embodiment of a method for separating mercury.

In FIG. 3 another embodiment of the separation of mercury from the exhaust gases 1 during the production of cement clinker is shown. The sub-flow 13 is extracted from the exhaust gases 1 after the pre-heating stage 2 at a temperature of more than 300° C. and dedusted in the separator 14 at temperatures of more than 300° C. The separated dust 15 is recirculated into the preheating stage 2. The sub-flow 13 of exhaust gases 1, which has been dedusted at least partially, is cooled with the cleaned sub-flow 13 by means of a heat exchanger 20 and cooled to a temperature of 60 to 200° C., preferably 80 to 140° C., in the cooler 21. Additives 16 (such as activated carbon) are added to the cooled sub-flow 13 for bonding the mercury physically or chemically. Now bonded to particles, the mercury is separated by the separator stage 17, for example a bag filter. The mixture of partially unused additives 16 and separated mercury may be recirculated, at least partially, into the unclean sub-flow 13 of exhaust gases 1 via the connection line 22, or it may be discharged from the system via the line 18. The cleaned sub-flow 13 is heated by the heat exchanger 20 once again, and recirculated into the line of exhaust gases 1.

The heart of the present method and the device is that only part of the exhaust gases 1 is treated in order to reduce the emissions of mercury that are discharged into the atmosphere. Combining an increase in the concentration of mercury in the dust flow and the material flow conducted in the circuit during the production of cement clinker with the treatment of a sub-flow of exhaust gases allows relatively good separation rates, for example 20 to 80%, at low purchase and operating costs.

The advantages of the method according to the invention and the device according to the invention are that existing facilities may be retrofitted easily and a good energy balance may be obtained. The method and the device are substantially more cost-efficient than methods that are currently known and in use, in particular during operation.

The invention claimed is:

1. A method for separating mercury from exhaust gases during production of cement clinker, which comprises the steps of:

feeding in raw materials, required for producing the cement clinker, into a pre-heating stage against a direction of flow of the exhaust gases according to a counter flow principle, and the mercury bonded in the raw materials is vaporized due to a heating of the raw materials in the pre-heating stage;

firing the raw material in a rotary kiln;

using the exhaust gases conducted in a main flow for at least partially mill drying the raw materials in at least one raw mix mill;

dedusting the exhaust gases in at least one filter stage before the exhaust gases escape into atmosphere;

feeding dust separated in the at least one filter stage into the pre-heating stage at least partially together with a milled raw material;

forming a circuit for the mercury in the exhaust gases between the pre-heating stage and the raw mix mill or the at least one filter stage; and branching off from the main flow of the exhaust gases a sub-flow of 1 to 30 percent by volume of the exhaust gases having a temperature of at least 300° C., and the exhaust gases of the sub-flow are first dedusted and then the mercury contained therein is separated.

2. The method according to claim 1, which further comprises lowering a temperature of the exhaust gases of the sub-flow before the separation of the mercury.

3. The method according to claim 1, which further comprises recirculating the dust separated in the sub-flow into the pre-heating stage.

4. The method according to claim 1, which further comprises recirculating the exhaust gases of the sub-flow into the main flow of exhaust gases.

5. The method according to claim 1, which further comprises recovering heat of the exhaust gases of the sub-flow after the dedusting.

6. The method according to claim 1, which further comprises, as seen in the flowing direction of the exhaust gases, branching the sub-flow of the exhaust gases from the main flow of the exhaust gases after or in the pre-heating stage.

7. The method according to claim 1, which further comprises adding at least a portion of the dust of the exhaust gases separated in the at least one filter stage to the branched-off sub-flow of the exhaust gases.

8. The method according to claim 1, which further comprises separating the mercury from the exhaust gases of the sub-flow by means of a bag filter.

9. The method according to claim 8, which further comprises adding an additive before the separation of mercury.

10. The method according to claim 1, which further comprises separating the mercury from the exhaust gases of the sub-flow by means of a scrubber.

11. The method according to claim 1, which further comprises separating the mercury from the exhaust gases of the sub-flow by means of a fixed-bed adsorber or a moving-bed adsorber.

12. The method according to claim 1, which further comprises increasing a concentration of the mercury in the main flow of the exhaust gases.

13. The method according to claim 12, which further comprises increasing a concentration of the mercury in the main flow of the exhaust gases by optimizing the at least one filter stage in the main flow of the exhaust gases for the separation of the mercury, and by feeding into the pre-heating stage at least part of the mercury separated in the at least one filter stage.

14. The method according to claim 13, which further comprises improving the separation of the mercury in the at least one filter stage of the main flow of the exhaust gases by adding additives selected from the group consisting of bromides, chlorides and activated carbon.

15. The method according to claim 13, which further comprises improving the separation of the mercury in the at least one filter stage of the main flow of the exhaust gases by decreasing the temperature before the at least one filter stage.

16. The method according to claim 13, which further comprises improving the separation of the mercury in the at least one filter stage of the main flow of the exhaust gases by means of a catalyzer, which is disposed between the pre-heating stage and the raw mix mill or the at least one filter stage and alters a chemical bonding of the mercury.

17. The method according to claim 16, which further comprises adding a reactive agent for altering the chemical bonding of the mercury before the catalyzer.

18. The method according to claim 1, which further comprises branching off 5-20 percent by volume from the main flow of the exhaust gases as the sub-flow.

19. The method according to claim 9, wherein the additive is a reactive agent for altering physical properties of the mercury or adsorbing substances for bonding the mercury.

* * * * *